United States Patent [19]
Denley

[11] Patent Number: 5,414,937
[45] Date of Patent: May 16, 1995

[54] HEADLAMP INDICATING DEVICE WITH HIGHLIGHTED LEVEL BUBBLE

[75] Inventor: Ronald S. Denley, Woodstock, Ill.

[73] Assignee: Elco Industries, Inc., Rockford, Ill.

[21] Appl. No.: 213,436

[22] Filed: Mar. 14, 1994

[51] Int. Cl.$^6$ .................................. G01C 9/32
[52] U.S. Cl. ........................ 33/379; 33/288; 33/385; 362/61
[58] Field of Search ............... 33/288, 365, 377, 379, 33/380, 381, 382, 383, 384, 385, 386, 387, 388, 389; 362/61, 66

[56] References Cited

U.S. PATENT DOCUMENTS

| | | | |
|---|---|---|---|
| 1,082,163 | 12/1913 | Lung | 33/381 |
| 5,140,593 | 8/1992 | Lisak | 33/288 |
| 5,207,004 | 5/1993 | Gruetzmacher | 33/379 |
| 5,359,499 | 10/1994 | Denley | 33/384 |

FOREIGN PATENT DOCUMENTS

| | | | |
|---|---|---|---|
| 0530171A1 | 3/1993 | European Pat. Off. | 33/377 |
| 2222677 | 3/1990 | United Kingdom | 33/379 |

Primary Examiner—William A. Cuchlinski, Jr.
Assistant Examiner—G. Bradley Bennett
Attorney, Agent, or Firm—Leydig, Voit & Mayer, Ltd.

[57] ABSTRACT

The indicating device includes a bubble level formed by a transparent plastic vial filled with liquid having a gas bubble therein, the bubble coacting with an underlying scale to indicate the degree of tilt of the vial from horizontal. To enhance the visibility of the bubble and enable more accurate readings, portions of the vial are darkened with a strip of black material adapted to be secured to the vial by pressure-sensitive adhesive. A cap for closing the vial is darkened by molding the cap from black-tinted plastic.

13 Claims, 1 Drawing Sheet

HEADLAMP INDICATING DEVICE WITH HIGHLIGHTED LEVEL BUBBLE

BACKGROUND OF THE INVENTION

This invention relates to a device for indicating the degree of tilt of a vehicle headlamp beam and, more specifically, to a device having a bubble level formed by a liquid-filled vial with a gas bubble therein that coacts with a graduated scale to indicate the degree of tilt of the vial from horizontal.

Such an indicating device typically is mounted on the frame or other component of the headlamp assembly. At the vehicle assembly plant, the frame is tilted about a horizontal axis to establish proper aim of the headlamp beam in a vertical direction. Once this is achieved, the indicating device is calibrated in order to "zero" the bubble and establish the preset position of the headlamp. If the headlamp subsequently becomes improperly aimed, the indicating device may be used to determine when the lamp has been adjusted back to the preset position.

The vial of the bubble level usually is molded of plastic and, after being filled with liquid, is closed by a plastic cap. The vial is transparent in order to enable viewing of the bubble and the scale.

Use of a bubble level as a means for indicating the angle of inclination from true level has an inherent degree of inaccuracy. In large, the problem resides in interpreting where the peripheral edge of the bubble lies. The meniscus formed by the surface tension of the fluid against the wall of the vial results in a visual thickness of the peripheral edge of the bubble. This thickness can result in erroneous readings, even when gauging the bubble position between a scale and the fore and aft region of the bubble. Also, there usually is a poor visual contrast between the liquid and the bubble. As a result, even estimating the center of the bubble becomes difficult.

SUMMARY OF THE INVENTION

The general aim of the present invention is to provide a bubble level especially adapted for use with a vehicle headlamp and having a visually highlighted bubble which enables a more accurate reading of the position of the bubble relative to an underlying scale.

A more detailed object of the invention is to achieve the foregoing by creating a high contrast ring within the meniscus of the bubble, the thickness of the high contrast ring nearly matching the line thickness of the printed scale such that the printed scale is complemented by the high contrast ring to provide a more accurate indication of the position of the bubble and the off level condition.

The invention also resides in the relatively inexpensive but highly effective manner of highlighting the bubble.

These and other objects and advantages of the invention will become more apparent from the following detailed description when taken in conjunction with the accompanying drawings.

Figure 1:
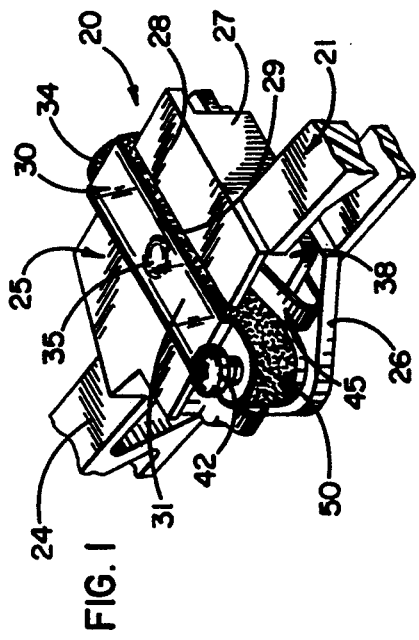
FIG. 1 is a perspective view of a new and improved headlamp indicating device incorporating the unique features of the present invention.
Figure 3:
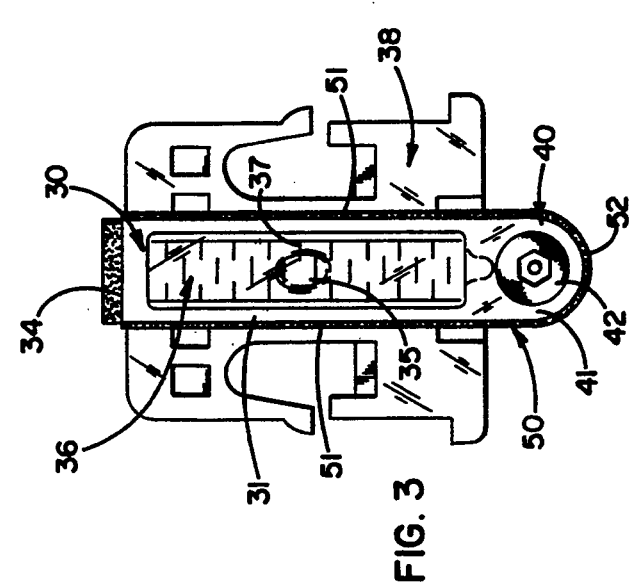
FIG. 3 is an enlarged top plan view of the bubble level shown in FIG. 2.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in a level indicating device 20 which is associated with a frame 21 for holding a vehicle headlamp (not shown) and for mounting the headlamp on a vehicle body. As is conventional, the headlamp frame is supported on the body to pivot about a horizontal axis and is adapted to be pivoted about such axis by a manually operable adjusting device (not shown) which may, for example, be of the type disclosed in U.S. Pat. No. 5,193,905. During assembly of the vehicle, the frame is tilted as necessary to aim the headlamp properly in the vertical direction. Once the proper aim has been established, the indicating device is "zeroed" in order to establish the proper aim for future reference.

The present headlamp frame 21 is molded of plastic and includes an upper frame member 24 with a housing 25. The housing 25 comprises a flat bottom wall 26, a pair of laterally spaced and upwardly projecting side walls 27, and a top wall 28. A generally longitudinally extending slot 29 is formed vertically through the top wall and extends between the front and rear ends of the housing. The various walls 26, 27 and 28 define an internal chamber within which a substantial portion of the indicating device 20 is housed.

The present indicating device 20 includes a bubble level formed in part by a transparent vial 30 having a plastic body portion with a generally rectangular external cross-sectional shape. Thus, the vial includes generally parallel upper and lower walls 31 and 32 and generally parallel and laterally facing side walls 33 which extend between the walls 31 and 32. The vial is molded of a single piece of transparent plastic and initially is open at its forward end.

The vial 30 contains a clear viscous liquid which is sealed in the vial by a generally circular cap 34 molded of plastic and ultrasonically welded or otherwise suitably secured with a liquid-tight seal to the forward end of the vial. A gas bubble 35 is entrapped in the liquid and, as is typical of bubble levels, moves toward that end of the vial that is tilted upwardly from horizontal. A graduated scale 36 underlies the vial 30 and coacts with the vial to indicate the degree of tilt of the vial from horizontal. In this instance, the graduations of the scale 36 are lines printed on a strip of plastic or similar material which is glued to the underside of the lower wall 32 by an optically clear adhesive. The graduations include a "zero" mark 37 indicating that the vial is level when the bubble is centered over such mark, and further include various other marks indicative of the degree that the vial is out of level in one direction or the other. The inner side of the upper wall 31 of the vial has a radius of curvature that lies in the vertical aiming plane of the headlamp beam. The apex of such curvature coincides with the "zero" mark, and the spacing of the graduations is related geometrically to the radius of curvature.

The vial 30 is molded integrally with a base 38 which helps hold the indicating device 20 in the housing 25 of the frame 21. Projecting upwardly from the base and rearwardly from the rear wall of the vial is a rounded nose 40 which is molded integrally with the base and the vial and which includes a top surface 41 extending parallel to and spaced somewhat below the upper wall 31 of the vial. An adjusting screw 42 with a right hand thread is threaded through the nose and its lower end bears against the bottom wall 26 of the housing 25.

The indicating device 20 also includes a spring metal retaining bracket 45 (FIG. 1) which coacts with the base 38 to hold the indicating device in the housing 25 and which coacts with the screw 42 to effect adjustment of the device. Reference is made to commonly assigned Denley U.S. application Ser. No. 08/085,650, filed Jun. 30, 1993 for a detailed disclosure of the bracket. That application also contains a detailed disclosure relating to use of the adjusting screw 42 to tilt the vial 30 and "zero" the bubble 35 relative to the scale 36. Briefly, when the screw is turned clockwise,, it bears downwardly against the bottom wall 26 of the housing 25 and lifts the front end of the vial via the screw threads. This forces the rear end of the device to pivot upwardly about a fulcrum defined by the forward edge of the bottom wall 26 and causes the bubble to shift from front-to-rear in the vial. When the screw is loosened, the spring metal retaining bracket 45 forces the rear end of the vial to pivot downwardly about the aforementioned fulcrum so as to effect rear-to-front movement of the bubble.

After the headlamp has been adjusted, it is important to adjust the vial 30 to a position in which the bubble 35 is precisely centered over the zero mark 37. Also, if re-adjustment of the headlamp is subsequently required, it is important to be able to clearly determine when the bubble is centered .over the zero mark so that adjustment of the headlamp may be terminated when the headlamp has been properly re-aimed. In accordance with the present invention, the bubble 35 is highlighted and is more distinguishable in the liquid so as to enable better viewing of the bubble and to enable the exact position of the bubble relative to the scale 36 to be more easily determined.

The foregoing is achieved by darkening the sides and ends of the vial 30 such that the sides and ends are preferably opaque and are preferably black. Various means of darkening the surfaces may be employed such as painting, plating, sputtering, ink jet printing, pad or transfer printing, or screen printing the surfaces. Alternatively, the surfaces may be darkened by use of elastomeric bands, molded elastomeric boots or heat-shrinkable plastic sleeving. The preferred manner of darkening the surfaces, however, is through use of a preferably opaque and preferably black strip 50 having a coating of pressure-sensitive adhesive on one side, the strip being black throughout its entire thickness. Alternatively, the strip could be darkly translucent and could be of colors other than black.

Figure 4:
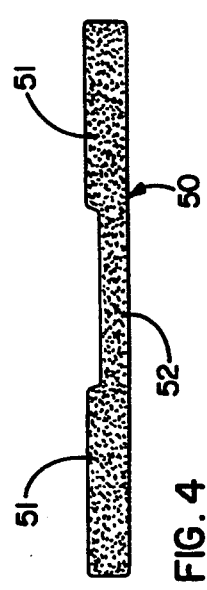
FIG. 4 is a rolled out view of a strip for darkening portions of the vial and creating the high contrast ring within the meniscus of the bubble.
Figure 2:
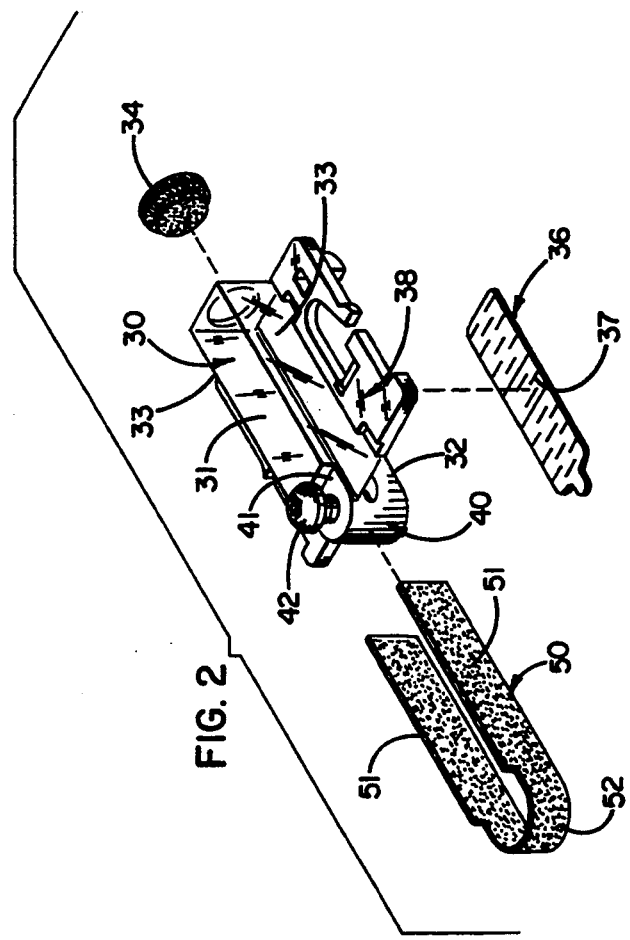
FIG. 2 is an exploded perspective view of the components of the bubble level of the device.

The strip 50 is shown in rolled-out form in FIG. 4 and comprises two elongated end portions 51 having substantially the same height and length as the height and length of the side walls 33 of the vial 30. Located midway between the end portions 51 of the strip is a central portion 52 whose height is substantially equal to the height of that portion of the nose 40 above the base 38. The length of the central portion corresponds to the distance around the rear of the nose.

When the strip 50 is adhesively secured to the vial 30, the end portions 51 of the strip substantially cover all of the side walls 33 while the central portion 52 substantially covers all of the nose 40 except for the top and bottom surfaces thereof. In order to darken the forward end of the vial 30, the cap 34 is simply tinted in molding of a color to match the strip. This avoids the need of configuring the strip 50 to conform to the circular shape of the cap and simplifies assembly of the strip to the vial. Such assembly may be achieved at high speed and low cost by automated equipment.

By virtue of the black strip 50 and the black cap 34, the resulting image when viewing the vial 30 from above is a black lined oval positioned over the black lined scale 36. The incident rays from the darkened surfaces are reflected and refracted at the surface of separation of the bubble 35 and the vial. As a result, a high contrast ring is created within the meniscus of the bubble and its thickness nearly matches the line thickness of the scale. This enables an easier determination of where the peripheral edge of the bubble lies and enables a more accurate indication of the position of the bubble. Because the bubble is highlighted, real time camera imagery is better able to distinguish the bubble and may be used for inspection purposes and for statistical control.

I claim:

1. An indicating device for a vehicle headlamp, said device comprising a vial molded from a single piece of transparent plastic, said vial having first and second ends, having upper and lower sides and having laterally facing and laterally spaced sides extending between said upper and lower sides, adjusting means associated with said vial and selectively operable to change the inclination of said vial, one end of said vial being open, a plastic cap molded separately of and attached to said vial and closing said one end thereof, said vial containing liquid having a gas bubble therein, a scale on the lower side of said vial and coacting with said bubble to indicate when said vial is horizontal, said bubble and said scale being visible through the transparent upper side of said vial, and a covering of non-transparent material on the laterally facing sides of said vial and shading the interior of said vial to effect visual highlighting of said bubble.

2. An indicating device as defined in claim 1 in which said covering comprises preformed and elongated strip means adhesively secured to said laterally facing sides of said vial.

3. An indicating device as defined in claim 2 in which said strip means are substantially opaque.

4. An indicating device as defined in claim 3 in which said strip means are substantially black in color throughout the entire thickness of the strip means.

5. An indicating device as defined in claim 3 in which said cap is substantially opaque.

6. An indicating device as defined in claim 5 in which said cap is molded of substantially black plastic.

7. An indicating device as defined in claim 5 further including a transparent nose molded integrally with and extending from said vial and having top and bottom surfaces, said strip means also being adhesively secured to said nose and covering substantially all of said nose except for the top and bottom surfaces thereof.

8. An indicating device as defined in claim 7 in which said strip means consist of a single strip having a coating of pressure-sensitive adhesive for securing said strip to said vial and said nose.

9. An indicating device as defined in claim 8 in which said vial is of substantially rectangular cross-section, the top surface of said nose being spaced below the upper surface of said vial, said strip having end portions of a predetermined height for covering said laterally facing sides of said vial and having a central portion of lesser height for covering substantially all of said nose except for the top and bottom surfaces thereof.

10. An indicating device as defined in claim 1 in which said covering comprises substantially black paint in direct and intimate contact with said laterally facing sides.

11. An indicating device for a vehicle headlamp, said device comprising a vial molded from a single piece of transparent plastic, said vial having first and second ends, having upper and lower sides and having laterally facing and laterally spaced sides extending between said upper and lower sides, adjusting means associated with said vial and selectively operable to change the inclination of said vial, the first end of said vial being open, a plastic cap molded separately of and attached to said vial and closing said first end thereof, said vial containing liquid having a gas bubble therein, a scale on the lower side of said vial and coacting with said bubble to indicate when said vial is horizontal, said bubble and said scale being visible through the transparent upper side of the vial, said cap and said second end of said vial being substantially darker than said upper side of said vial so as to shade the interior of said vial and effect visual highlighting of said bubble.

12. An indicating device as defined in claim 11 in which said laterally facing sides of said vial are also substantially darker than said upper side of said vial.

13. An indicating device for a vehicle headlamp, said device comprising a vial molded from a single piece of transparent plastic, said vial being of generally rectangular cross-section and having first and second ends, having upper and lower sides and having two laterally facing sides, a transparent plastic nose molded integrally with and projecting from said first end of said vial, said nose having top and bottom surfaces with said top surface being spaced below said upper side of said vial, adjusting means extending substantially vertically through said nose and selectively operable to change the vertical position of said first end of said vial, said second end of said vial being open, a cap molded separately of said vial and made of substantially opaque plastic, said cap being attached to said vial and closing the second end thereof, said vial containing liquid having a gas bubble therein, a scale on the lower side of said vial and coacting with said bubble to indicate when said vial is horizontal, said bubble and said scale being visible through the transparent upper side of said vial, and a single-piece and substantially opaque strip adhesively secured to said vial and said nose, said strip substantially covering said laterally facing sides of said vial and substantially covering all of said nose except for said top and bottom surfaces thereof, said substantially opaque strip coacting with said substantially opaque cap to shade the interior of said vial and to effect visual highlighting of said bubble.

* * * * *